United States Patent
Arruda et al.

(10) Patent No.: US 7,763,104 B2
(45) Date of Patent: Jul. 27, 2010

(54) HYDROCARBON TRAP ASSEMBLY

(75) Inventors: Anthony C. Arruda, Ann Arbor, MI (US); Neville J. Bugli, Novi, MI (US); Hovie J. Cassell, Birmingham, MI (US); David Frey, Northville, MI (US); Ryan Grimes, Dearborn, MI (US); Mark D. Hellie, Westland, MI (US); Jeffry M. Leffel, Wixom, MI (US); Christopher K. Roosen, Northville, MI (US); Jacqueline L. Tomlin, Redford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 521 days.

(21) Appl. No.: 11/515,611

(22) Filed: Sep. 5, 2006

(65) Prior Publication Data
US 2008/0053050 A1    Mar. 6, 2008

(51) Int. Cl.
F02M 33/02 (2006.01)
B01D 53/04 (2006.01)

(52) U.S. Cl. .................................. 96/134; 96/154
(58) Field of Classification Search ......... 123/518–520; 96/134, 135, 147, 151, 154; 55/385.3, 490, 55/516–519, DIG. 31
See application file for complete search history.

(56) References Cited

U.S. PATENT DOCUMENTS

| | | | | |
|---|---|---|---|---|
| 2,214,925 A * | 9/1940 | Guthrie | .......... | 96/134 |
| 2,554,879 A * | 5/1951 | Race, Jr. | .......... | 96/117.5 |
| 3,309,849 A * | 3/1967 | Ward | .......... | 96/134 |
| 3,368,326 A | 2/1968 | Hervert | | |
| 3,541,765 A * | 11/1970 | Adler et al. | .......... | 96/138 |
| 3,572,013 A * | 3/1971 | Hansen | .......... | 96/138 |
| 3,572,014 A * | 3/1971 | Hansen | .......... | 96/138 |
| 3,678,663 A | 7/1972 | Hansen | | |
| 3,849,093 A | 11/1974 | Konishi et al. | | |
| 3,854,912 A * | 12/1974 | Terrel et al. | .......... | 96/134 |
| 3,990,872 A * | 11/1976 | Cullen | .......... | 96/6 |
| 4,279,630 A * | 7/1981 | Nakamura et al. | .......... | 96/138 |
| 4,300,511 A | 11/1981 | Lang | | |
| 4,418,662 A | 12/1983 | Engler et al. | | |
| 4,683,862 A | 8/1987 | Fornuto et al. | | |
| 5,914,294 A | 6/1999 | Park et al. | | |
| 5,980,616 A * | 11/1999 | Johnson et al. | .......... | 96/135 |
| 6,440,200 B1 | 8/2002 | Sakakibara et al. | | |
| 6,464,761 B1 * | 10/2002 | Bugli | .......... | 96/135 |
| 6,637,415 B2 | 10/2003 | Yoshioka et al. | | |
| 6,692,551 B2 | 2/2004 | Wernholm et al. | | |
| 6,692,555 B2 * | 2/2004 | Oda et al. | .......... | 96/134 |
| 6,699,310 B2 * | 3/2004 | Oda et al. | .......... | 96/132 |
| 6,699,561 B2 | 3/2004 | Wolff | | |
| 6,736,871 B1 | 5/2004 | Green et al. | | |
| 6,758,885 B2 | 7/2004 | Leffel et al. | | |
| 6,817,345 B2 | 11/2004 | Lawrence | | |
| 6,835,237 B2 | 12/2004 | Ishida | | |
| 6,913,001 B2 | 7/2005 | Abdolhosseini et al. | | |
| 2002/0043156 A1 * | 4/2002 | Shea | .......... | 96/134 |
| 2002/0124733 A1 * | 9/2002 | Iriyama et al. | .......... | 96/134 |
| 2005/0081717 A1 * | 4/2005 | Meiller et al. | .......... | 96/154 |
| 2006/0107836 A1 * | 5/2006 | Maier et al. | .......... | 96/134 |

* cited by examiner

Primary Examiner—Frank M Lawrence
(74) Attorney, Agent, or Firm—Fraser Clemens Martin & Miller LLC; J. Douglas Miller

(57) ABSTRACT

A hydrocarbon adsorption assembly is shown, wherein the hydrocarbon adsorption assembly is disposed in an encapsulating layer adapted to be received by an air filter of an automobile.

11 Claims, 4 Drawing Sheets

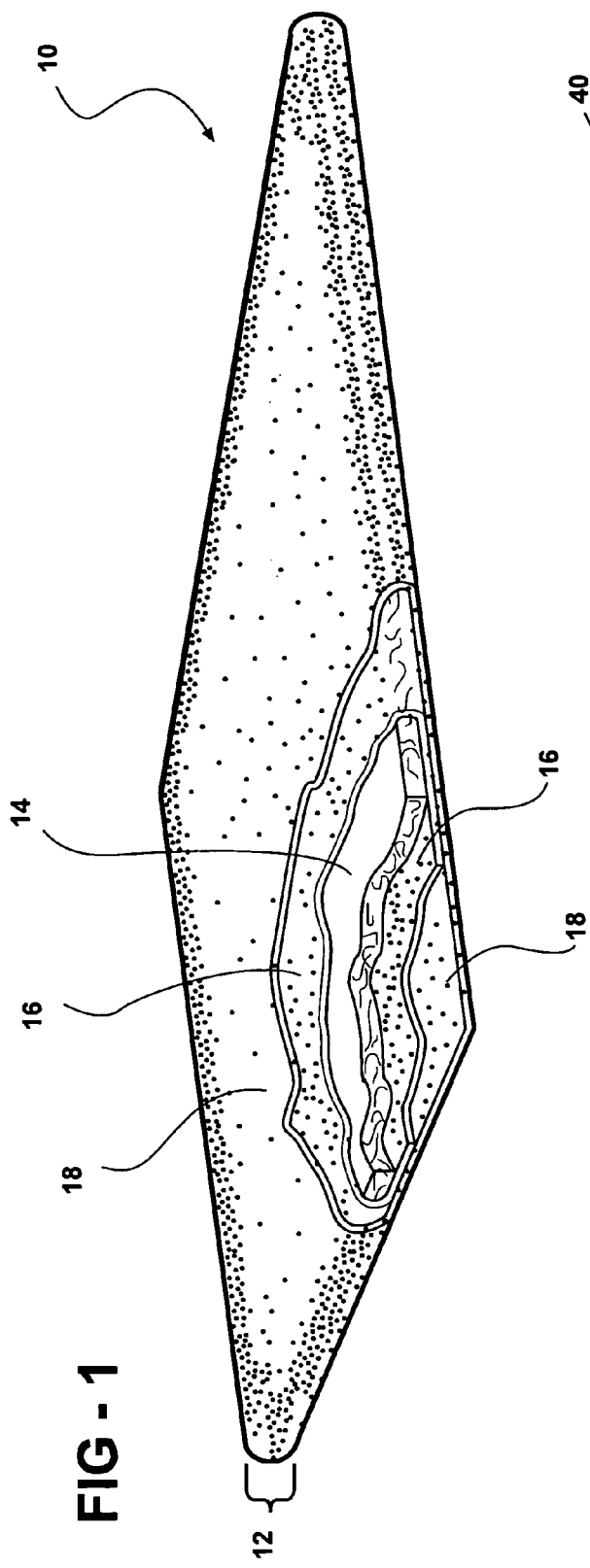
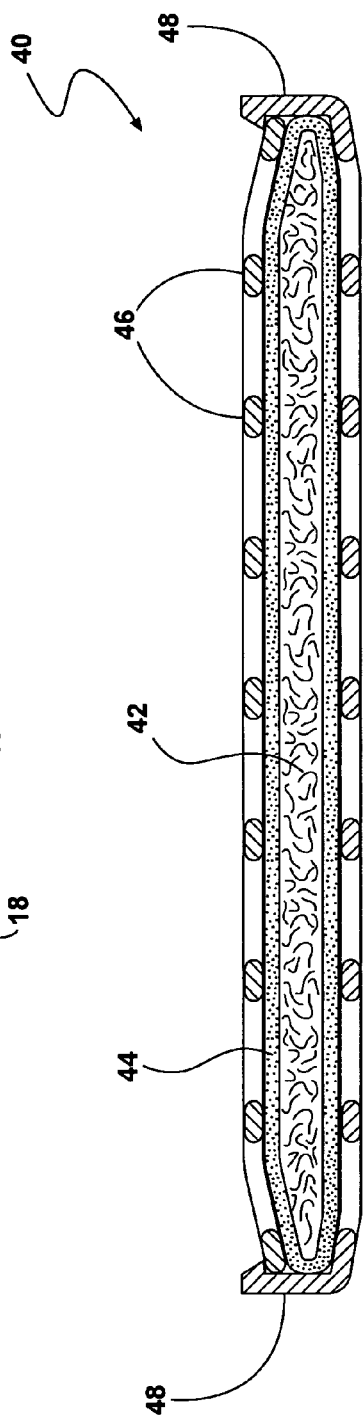

FIG - 6
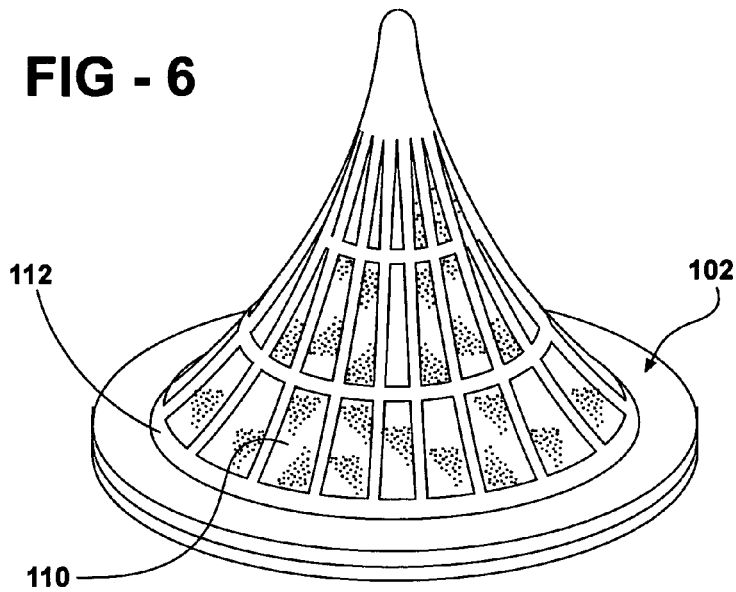
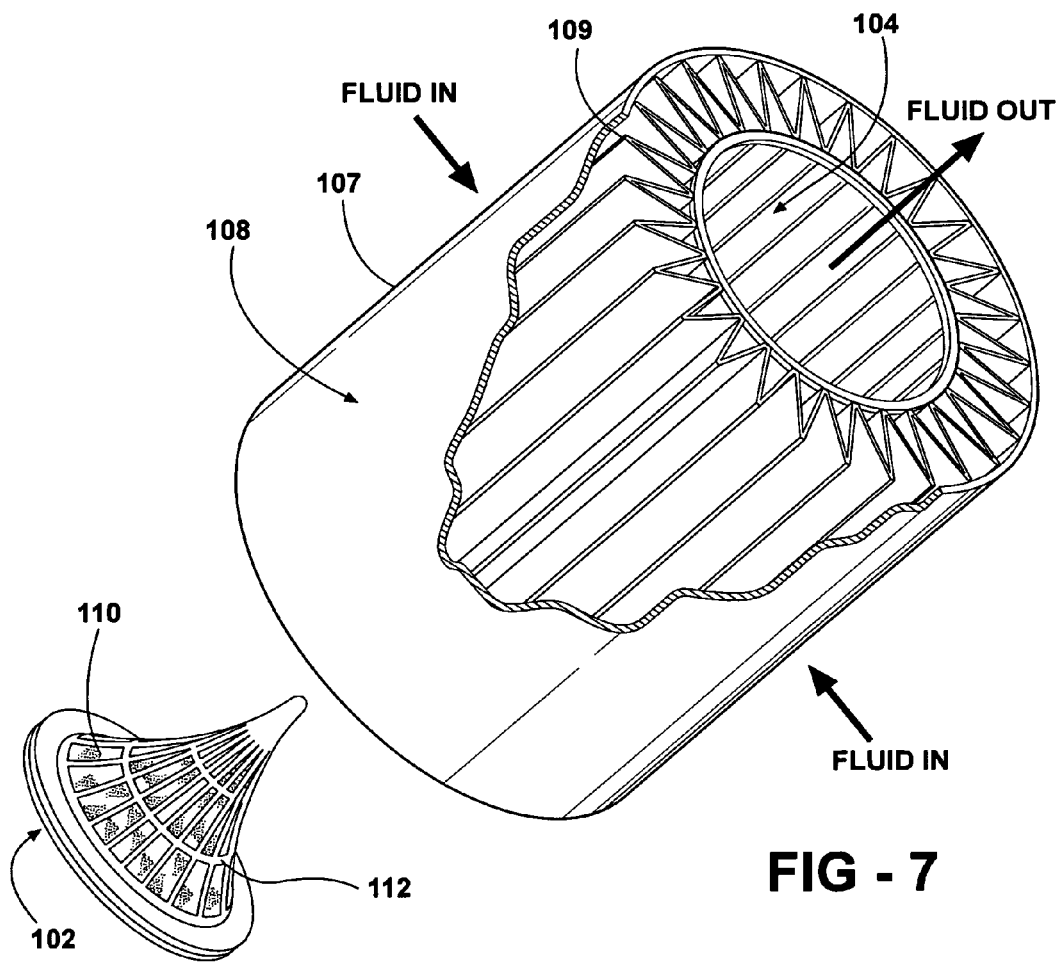
FIG - 7

HYDROCARBON TRAP ASSEMBLY

FIELD OF THE INVENTION

The present invention relates to a hydrocarbon trap assembly and more particularly to a hydrocarbon trap assembly for use with a clean air filter in an air induction system of a vehicle.

BACKGROUND OF THE INVENTION

Due to laws requiring the reduction of the levels of hydrocarbons that vehicles may emit into the atmosphere, it is necessary for automotive designers to include systems in vehicles to measure and control emissions. Hydrocarbons are released in a vehicle's exhaust, as well as from the engine, even when the engine is not operating. These emissions leak out of the vehicle from many sources, including an air induction system.

Many methods have been utilized to measure the level of hydrocarbons in the exhaust. For example, the hydrocarbon level in vehicle exhaust gas is measured by placing a hydrocarbon adsorbing material in the exhaust stream of the vehicle. The hydrocarbon adsorbing material is connected to a sensor. The sensor is connected to an on-board diagnostic system that monitors the exhaust emissions and notifies an operator of the vehicle when the hydrocarbon level exceeds a certain level. However, this method does not significantly reduce the hydrocarbon emissions.

One method of reducing the levels of hydrocarbon emissions is to adsorb or trap hydrocarbons with the use of a filter-like device. Typically, the hydrocarbon-trapping device is formed of monolith carbon that is disposed in the air induction system of motor vehicles. One of the problems with such positioning of the hydrocarbon-trapping device in the air induction system is the risk of breakage due to vibration or throttle engine backfire. In addition to the loss of function of the hydrocarbon-trapping device, large pieces of carbon monolith can be drawn into the engine, which can cause undesirable damage. A further problem can arise if the adsorbing element becomes saturated with hydrocarbons, which can significantly reduce the efficiency.

It would be desirable to produce a hydrocarbon-trapping device that maximizes hydrocarbon adsorption, wherein a positioning and design of the device militates against damage to the device and facilitates access to the device for replacement.

SUMMARY OF THE INVENTION

Harmonious with the present invention, a hydrocarbon-trapping device that maximizes hydrocarbon adsorption, wherein a positioning and design of the device militates against damage to the device and facilitates access to the device for replacement, has surprisingly been discovered.

In one embodiment, a hydrocarbon adsorption assembly comprises a first encapsulating layer adapted to be received by an air filter housing; and a carbon based media disposed in the first encapsulating layer.

In another embodiment, a hydrocarbon adsorption assembly comprises a first encapsulating layer; a second encapsulating layer adapted to receive the first encapsulating layer, wherein at least one of the first encapsulating layer and the second encapsulating layer is formed from at least one of an open cell foam and a reticulated foam; and a carbon based media disposed in the first encapsulating layer.

In another embodiment, an air filter assembly comprises a housing; a first filtering media; and a hydrocarbon adsorption assembly comprising a carbon based media and a first encapsulating layer.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings in which:

FIG. 1 is a perspective view of a hydrocarbon adsorption assembly in accordance with an embodiment of the invention;

FIG. 2 is a cross sectional view of a hydrocarbon adsorption assembly in accordance with another embodiment of the invention;

FIG. 6 is a perspective view of a hydrocarbon adsorption assembly in accordance with another embodiment of the invention; and FIG. 7 is an exploded perspective view of an air filter including the hydrocarbon adsorption assembly illustrated in FIG. 6.

DETAILED DESCRIPTION OF THE PREFERRED EMBODIMENT

Figure 3:
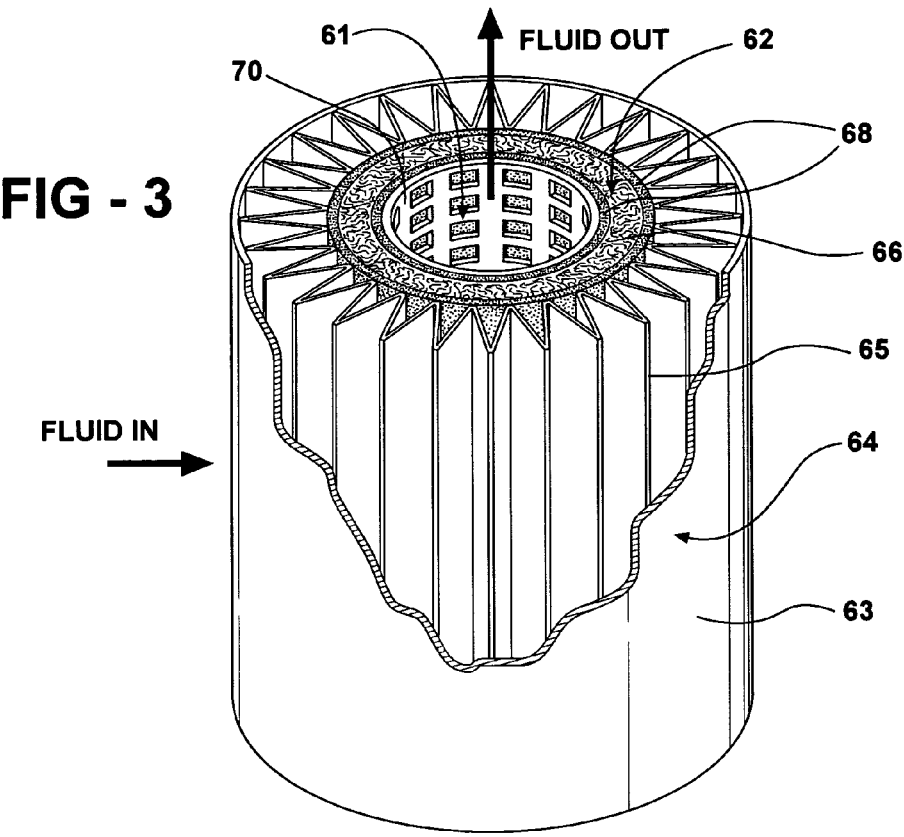
FIG. 3 is a perspective view of an air filter including a hydrocarbon adsorption assembly in accordance with another embodiment of the invention.

The following detailed description and appended drawings describe and illustrate various exemplary embodiments of the invention. The description and drawings serve to enable one skilled in the art to make and use the invention, and are not intended to limit the scope of the invention in any manner.

FIG. 1 shows a hydrocarbon adsorption assembly 10 in accordance with an embodiment of the invention. The hydrocarbon adsorption assembly 10 has a generally rectangular cross-sectional shape in plan and is adapted to be disposed in an air filter housing (not shown) of an automobile. However, it is understood that the hydrocarbon adsorption assembly 10 may have any suitable shape to facilitate placement in the air filter housing. The hydrocarbon adsorption assembly 10 includes a filter assembly 12 having a carbon based media 14 surrounded by a first encapsulating layer 16 and a second encapsulating layer 18. The carbon based media 14 can be any carbon based media capable of adsorbing hydrocarbon gases, such as a carbon monolith, for example. In the embodiment shown, the first encapsulating layer 16 and the second encapsulating layer 18 are formed from foam capable of collecting carbon dust shedding. Favorable results have been found wherein an open cell, reticulated foam, or reticulated "open cell" polyurethane foam are used. The density of the open cell foam is about 1.75 lb./cuft or 796 gms/cuft or 28111 gms/cuM. It should be appreciated that the reticulated foam has about 97% porosity, which is beneficial to airflow. However, other materials may be used to form the first and second encapsulating layers 16, 18 such as fabric, for example, without departing from the scope and spirit of the invention.

In use, fluid flows through the first and second encapsulating layers 16, 18. Contaminants are removed from the fluid and collected in the first and second encapsulating layers 16,

18. The fluid also flows through the carbon based media 14, where hydrocarbons are adsorbed therefrom. The fluid flows through the first and second encapsulating layers 16, 18 on the opposite side of the carbon based media 14. Carbon dust from the carbon based media 14 is removed from the fluid and collected in the first and second encapsulating layers 16, 18. When the carbon based media 14 reaches a predetermined saturation point with hydrocarbons or the first and second encapsulating layers 16, 18 reach a predetermined saturation point with carbon dust or other contaminants, the filter assembly 12 is removed and replaced.

Accordingly, the hydrocarbon adsorption assembly 10 facilitates hydrocarbon adsorption and filtering of carbon dust and other contaminants from a fluid. Additionally, the location of the hydrocarbon adsorption assembly 10 inside the air filter facilitates access to the hydrocarbon adsorption assembly 10 for replacement thereof.

FIG. 2 shows a hydrocarbon adsorption assembly 40 in accordance with another embodiment of the invention. The hydrocarbon adsorption assembly 40 includes a carbon based media 42 and a first encapsulating layer 44. The carbon based media 42 can be any carbon based media capable of adsorbing hydrocarbon gases, such as a carbon monolith, for example. In the embodiment shown, the first encapsulating layer 44 is formed from foam capable of collecting carbon dust shedding. Favorable results have been found wherein an open cell, reticulated foam, or reticulated "open cell" polyurethane foam are used. The density of the open cell foam is about 1.75 lb./cuft or 796 gms/cuft or 28111 gms/cuM. It should be appreciated that the reticulated foam has about 97% porosity, which is beneficial to airflow. However, other materials may be used to form the first encapsulating layer 44 such as fabric, for example, without departing from the scope and spirit of the invention. The first encapsulating layer 44 is disposed in a second encapsulating layer or frame 46 that includes a plurality of attachment features 48 for connecting the frame 46 to an air filter housing (not shown). The attachment features 48 are adapted to secure the hydrocarbon adsorption assembly 40 in the air filter housing. The attachment features 48 can be clips, screws, or other attachment features as desired.

In use, the attachment features 48 are used to attach the frame 46 to the air filter housing. The first encapsulating layer 44 collects contaminants such as carbon dust and the carbon based media 42 adsorbs hydrocarbons from a fluid flowing through the air filter as discussed above for FIG. 1. When the carbon based media 42 reaches a predetermined saturation point with hydrocarbons or the first encapsulating layer 44 reaches a predetermined saturation point with carbon dust or other contaminants, the attachment means 48 are detached from the air filter housing, and the hydrocarbon adsorption assembly 40 is removed and replaced. It is understood that if the frame 46 is not damaged, the carbon based media 42 can be removed from the frame 46 and replaced, and the frame 46 inserted back into the air filter housing.

Accordingly, the hydrocarbon adsorption assembly 40 facilitates hydrocarbon adsorption and filtering of carbon dust and other contaminants from a fluid. Additionally, the location of the hydrocarbon adsorption assembly 40 facilitates access to the hydrocarbon adsorption assembly 40 for replacement thereof, and the attachment features 48 facilitate an ease of replacement of the hydrocarbon adsorption assembly 40.

Figure 4:
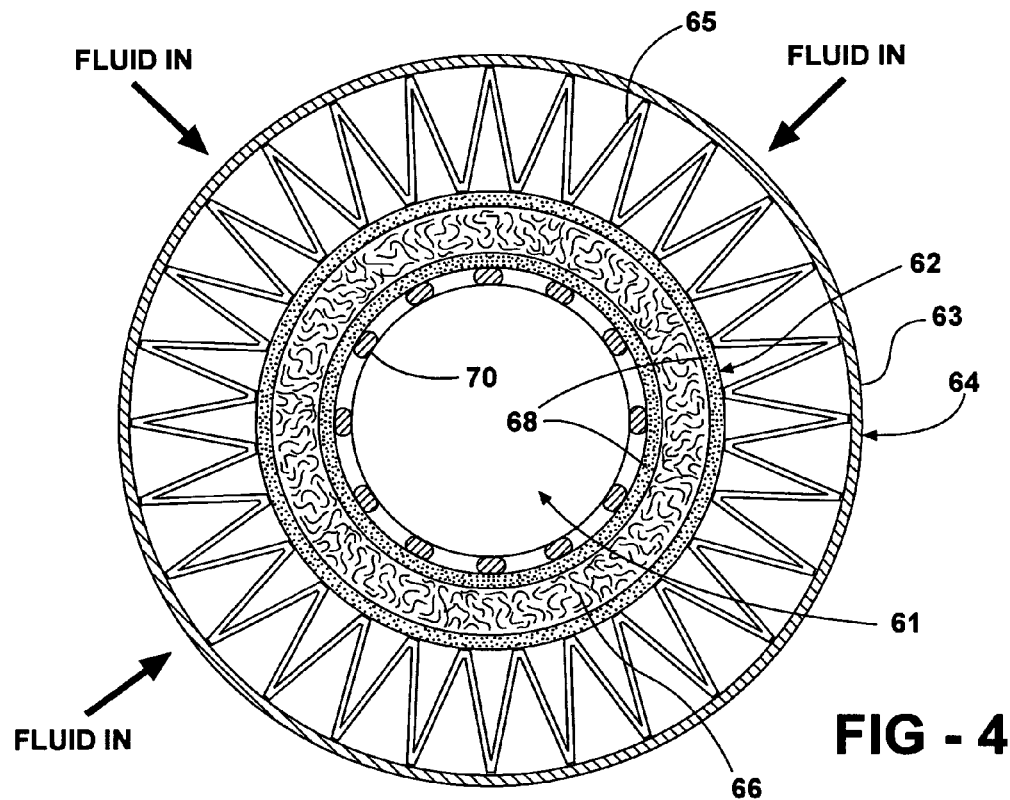
FIG. 4 is a top view of the air filter including a hydrocarbon adsorption assembly illustrated in FIG. 3.

FIGS. 3 and 4 illustrate a hydrocarbon adsorption assembly 62 disposed in an air filter assembly 64. The hydrocarbon adsorption assembly 62 has a hollow interior portion 61 and is disposed in the hollow interior portion of the air filter assembly 64. The air filter assembly 64 includes a housing 63 and a first filtering media 65 disposed in the housing 63. The hydrocarbon adsorption assembly 62 includes a carbon based media 66 surrounded by a first encapsulating layer 68. The carbon based media 66 can be any carbon based media capable of adsorbing hydrocarbon gases, such as a carbon monolith, for example. In the embodiment shown, the first encapsulating layer 68 is formed from foam capable of collecting carbon dust shedding. Favorable results have been found wherein an open cell, reticulated foam, or reticulated "open cell" polyurethane foam are used. The density of the open cell foam is about 1.75 lb./cuft or 796 gms/cuft or 28111 gms/cuM. It should be appreciated that the reticulated foam has about 97% porosity, which is beneficial to airflow. However, other materials may be used to form the first encapsulating layer 68 as desired without departing from the scope and spirit of the invention. In the embodiment shown, the first encapsulating layer 68 includes two separate layers of foam. However, a single layer of foam disposed on either side of the carbon based media 66 or surrounding the carbon based media 66 may be used as desired. The hydrocarbon adsorption assembly 62 includes a second layer or frame 70 that is adapted to be received in the hollow interior portion 61 of the hydrocarbon adsorption assembly 62.

In use, fluid flows into the air filter assembly 64 according to the directional arrows indicated in FIGS. 3 and 4. The filtering media 65 of the air filter assembly 64 removes contaminants from the fluid as is known in the art. The first encapsulating layer 68 collects contaminants such as carbon dust and the carbon based media 66 adsorbs hydrocarbons from a fluid flowing through the air filter assembly 64 as discussed above for FIG. 1. Thereafter, the fluid flows through the frame 70 into the hollow interior portion 61, and out of the air filter assembly 64. When the carbon based media 66 reaches a predetermined saturation point with hydrocarbons or the first encapsulating layer 68 reaches a predetermined saturation point with carbon dust or other contaminants, the hydrocarbon adsorption assembly 62 is removed and replaced. It is understood that if the frame 70 is not damaged, the carbon based media 66 and the first encapsulating layer 68 can be removed from the frame 70 and replaced, and the frame 70 inserted back into the air filter assembly 64.

Accordingly, the hydrocarbon adsorption assembly 62 facilitates hydrocarbon adsorption and filtering of carbon dust and other contaminants. Additionally, the location of the hydrocarbon adsorption assembly 62 inside the air filter assembly 64 facilitates access to the hydrocarbon adsorption assembly 62 for replacement thereof.

Figure 5:
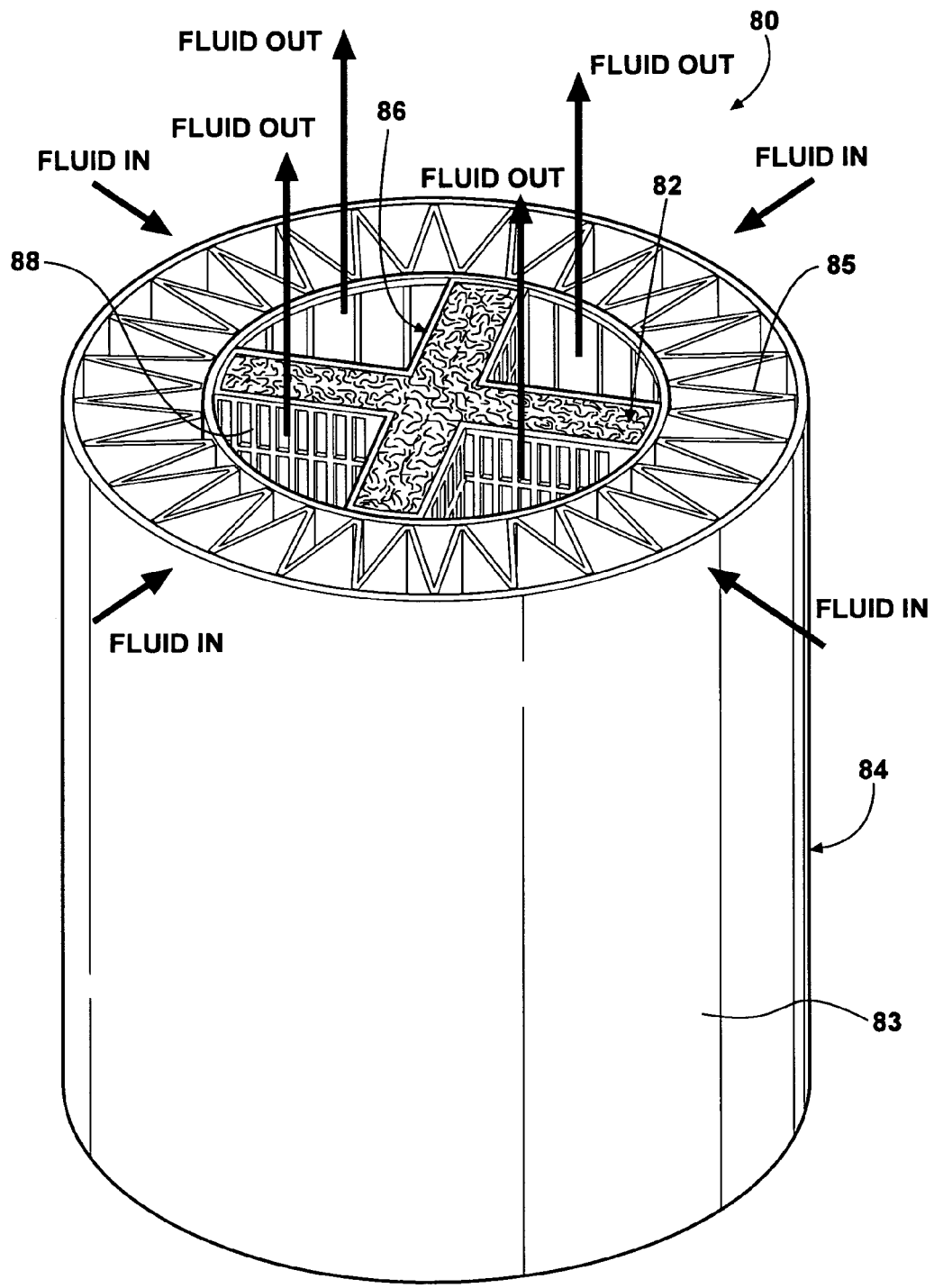
FIG. 5 is a perspective view of an air filter including a hydrocarbon adsorption assembly in accordance with another embodiment of the invention.

FIG. 5 shows a hydrocarbon adsorption assembly 82 in accordance with another embodiment of the invention. In the embodiment shown, the hydrocarbon adsorption assembly 82 is disposed in the hollow interior portion of an air filter assembly 84. The air filter assembly 84 includes a housing 83 and a first filtering media 85 disposed in the housing 85. The hydrocarbon adsorption assembly 82 is substantially X-shaped in cross section, and is adapted to be disposed in the hollow interior portion of the air filter assembly 84. It is understood that the hydrocarbon adsorption assembly 82 may have any suitable shape as desired. The hydrocarbon adsorption assembly 82 includes a carbon based media 86 disposed in a first encapsulating layer or frame 88. If desired, a second encapsulating layer (not shown) can be disposed adjacent or around the carbon based media 86.

In use, fluid flows into the air filter assembly 84 according to the directional arrows indicated. The first filtering media 83 of the air filter assembly 84 removes contaminants from the fluid as is known in the art. The carbon based media 86 adsorbs hydrocarbons from the fluid flowing adjacent thereto within the hollow interior portion of the air filter assembly 84.

Thereafter, the fluid flows out of the air filter assembly 84. When the carbon based media 86 reaches a predetermined saturation point with hydrocarbons, the hydrocarbon adsorption assembly 82 is removed and replaced. It is understood that if the frame 88 is not damaged, the carbon based media 86 can be removed from the frame 88 and replaced, and the frame 88 inserted back into the air filter assembly 84.

Accordingly, the hydrocarbon adsorption assembly 82 facilitates hydrocarbon adsorption in the air filter assembly 84. Since the fluid flows adjacent the carbon based media 86 and not therethrough, the flow is unrestricted by the carbon based media 86, and a flow rate through the air filter assembly 84 is maximized. Additionally, the location of the hydrocarbon adsorption assembly 82 inside the air filter assembly 84 facilitates access to the hydrocarbon adsorption assembly 82 for replacement thereof.

FIGS. 6 and 7 illustrate a hydrocarbon adsorption assembly 102 in accordance with another embodiment of the invention. The hydrocarbon adsorption assembly 102 is disposed in a hollow interior portion 104 of an air filter assembly 108. The air filter assembly 108 includes a housing 107 and a first filtering media 109 disposed in the housing 107. In the embodiment shown, the hydrocarbon adsorption assembly 102 has a substantially conical shape. However, the hydrocarbon adsorption assembly 102 may have any suitable shape as desired. The hydrocarbon adsorption assembly 102 is adapted to be received in the hollow interior portion 104 of the air filter assembly 108. The hydrocarbon adsorption assembly 102 includes a substantially conically shaped carbon based media 110 surrounded by a first encapsulating layer or frame 112. It is understood that the carbon based media 110 may have any suitable shape as desired. If desired, a second encapsulating layer (not shown) can be disposed adjacent or around the carbon based media 110.

In use, fluid flows into the air filter assembly 108 according to the directional arrows indicated. The first filtering media 109 of the air filter assembly 108 removes contaminants from the fluid as is known in the art. The carbon based media 110 adsorbs hydrocarbons from the fluid flowing adjacent to the hydrocarbon adsorption assembly 102 within the hollow interior portion 104 of the air filter assembly 108. Thereafter, the fluid flows out of the air filter assembly 108. When the carbon based media 110 reaches a predetermined saturation point with hydrocarbons, the hydrocarbon adsorption assembly 102 is removed and replaced. It is understood that if the frame 112 is not damaged, the carbon based media 110 can be removed from the frame 112 and replaced, and the frame 112 inserted back into the air filter assembly 108.

Accordingly, the hydrocarbon adsorption assembly 102 facilitates hydrocarbon adsorption. Since the fluid flows adjacent the carbon based media 110 and not therethrough, the flow is unrestricted by the carbon based media 110, and a flow rate through the air filter assembly 108 is maximized. Additionally, the location of the hydrocarbon adsorption assembly 102 inside the air filter assembly 108 facilitates access to the hydrocarbon adsorption assembly 102 for replacement thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A hydrocarbon adsorption assembly comprising:
    a first encapsulating layer adapted to be received by an air filter housing; and
    a carbon based media disposed in the first encapsulating layer, wherein the first encapsulating layer is a single, integral sheet of material that completely surrounds the carbon based media and abuts the surfaces of the carbon based media, the first encapsulating layer configured to collect carbon dust shedding from the carbon based media, wherein the first encapsulating layer is disposed between a first frame and a second frame, the first and second frames abutting opposing sides of the first encapsulating layer, wherein the first frame includes a fastening device having an L-shape with a detent formed at one end thereof, the fastening device disposed at a peripheral edge of the first frame, the fastening device extending from the first frame toward the second frame, the second frame secured to the first frame by the detent of the fastening device.

2. The hydrocarbon adsorption assembly defined in claim 1, wherein the air filter housing is cylindrical and has a hollow interior portion, the first encapsulating layer adapted to be disposed within the hollow interior portion.

3. The hydrocarbon adsorption assembly defined in claim 1, wherein the first encapsulating layer is formed from at least one of an open cell foam and a reticulated foam.

4. The hydrocarbon adsorption assembly defined in claim 1, wherein the first encapsulating layer is disposed in a second encapsulating layer, wherein the second encapsulating layer surrounds the first encapsulating layer.

5. An air filter assembly comprising:
    a housing having a hollow interior portion;
    a first filtering media disposed within the housing; and
    a hydrocarbon adsorption assembly comprising a carbon based media disposed in a first encapsulating layer, wherein the first encapsulating layer is a single, integral sheet of material that completely surrounds the carbon based media and abuts the surfaces of the carbon based media, the first encapsulating layer configured to collect carbon dust shedding from the carbon based media, the hydrocarbon adsorption assembly disposed within the housing and adjacent the first filtering media, wherein the housing is a cylindrical housing with an inner surface and an outer surface, the first filtering media being substantially cylindrical and abutting the inner surface of the housing, the first encapsulating layer of the hydrocarbon adsorption assembly being substantially cylindrical and abutting the first filtering media, the hydrocarbon adsorption assembly being coupled to the housing with at least one fastening device, wherein the air filter assembly includes a substantially cylindrical frame abutting the first encapsulating layer, the frame defining a boundary of the hollow interior portion of the air filter assembly.

6. The air filter assembly defined in claim 5, wherein the hydrocarbon adsorption assembly is completely disposed in the cylindrical housing, the hydrocarbon adsorption assembly disposed inside of the first filtering media.

7. The air filter assembly defined in claim 5, wherein the first encapsulating layer is disposed in a second encapsulating layer, wherein the second encapsulating layer surrounds the first encapsulating layer.

8. The air filter assembly defined in claim 5, wherein the first encapsulating layer is disposed adjacent a second encapsulating layer, wherein the second encapsulating layer is a frame abutting the first encapsulating layer, the second encapsulating layer disposed between the first encapsulating layer and the hollow interior portion of the housing.

9. An air filter assembly comprising:
a housing having a hollow interior portion;
a first filtering media disposed within the housing; and
a hydrocarbon adsorption assembly comprising a carbon based media disposed in a first encapsulating layer, wherein the first encapsulating layer surrounds the carbon based media, the hydrocarbon adsorption assembly disposed within the housing and adjacent the first filtering media,
wherein the housing is cylindrical, the hydrocarbon adsorption assembly is completely disposed in the cylindrical housing, the hydrocarbon adsorption assembly is disposed inside of the first filtering media, and the first encapsulating layer abuts the first filtering media.

10. A hydrocarbon adsorption assembly comprising:
a first encapsulating layer adapted to be received by an air filter housing; and
a carbon based media disposed in the first encapsulating layer, wherein the first encapsulating layer surrounds the carbon based media,
wherein the first encapsulating layer is disposed between a first frame and a second frame, the first and second frames abutting opposing sides of the first encapsulating layer, wherein the first frame includes a fastening device having an L-shape with a detent formed at one end thereof, the fastening device disposed at a peripheral edge of the first frame, the fastening device extending from the first frame toward the second frame, the second frame secured to the first frame by the detent of the fastening device.

11. An air filter assembly comprising:
a housing having a hollow interior portion;
a first filtering media disposed within the housing; and
a hydrocarbon adsorption assembly comprising a carbon based media disposed in a first encapsulating layer, wherein the first encapsulating layer surrounds the carbon based media, the hydrocarbon adsorption assembly disposed within the housing and adjacent the first filtering media,
wherein the housing is a cylindrical housing with an inner surface and an outer surface, the first filtering media being substantially cylindrical and abutting the inner surface of the housing, the first encapsulating layer of the hydrocarbon adsorption assembly being substantially cylindrical and abutting the first filtering media, the hydrocarbon adsorption assembly being coupled to the housing with at least one fastening device, wherein the air filter assembly includes a substantially cylindrical frame abutting the first encapsulating layer, the frame defining a boundary of the hollow interior portion of the air filter assembly.

* * * * *